July 9, 1946.  N. E. GADDINI  2,403,518

HOLDING UNIT FOR FRUIT

Filed April 14, 1945  2 Sheets-Sheet 1

INVENTOR
N. E. Gaddini
BY
ATTORNEYS

July 9, 1946.   N. E. GADDINI   2,403,518
HOLDING UNIT FOR FRUIT
Filed April 14, 1945   2 Sheets-Sheet 2

INVENTOR
N. E. Gaddini
BY
ATTORNEYS

Patented July 9, 1946

2,403,518

UNITED STATES PATENT OFFICE 2,403,518

HOLDING UNIT FOR FRUIT

Norman E. Gaddini, Winters, Calif.

Application April 14, 1945, Serial No. 588,336

14 Claims. (Cl. 146—28)

The present invention relates in general to the art of automatic fruit machinery, and especially machinery of such character adapted to accomplish mechanical halving and pitting of stone fruit, such as peaches and apricots.

This invention represents a modification of the Fruit holder shown in co-pending application, Serial No. 588,335 filed April 14, 1945.

One object of this invention is to provide an individual fruit holder of novel construction adapted for use, in an automatic fruit machine, to firmly hold the fruit in a predetermined position for sequential operations thereon, which result in halving and pitting of the fruit; there being a number of said holders mounted on a conveyor which moves the same intermittently and step by step through separate stations at which different operations are performed on said fruit. An automatic fruit machine of the above type is illustrated in copending application, Serial No. 533,548, filed May 1, 1944; the essence of the instant invention residing in the particular form and operation of the fruit holders.

Another object of the invention is to provide a fruit holder, for the purpose described, which is arranged to be actuated at a predetermined station, after certain bottom and side cutting operations on the fruit, to cause separation of the fruit halves at the bottom and about the uncut top portion of said fruit as a hinge, whereby to maintain the fruit in proper position for engagement and ejection of the pit by a downwardly moving pit ejection rod at said station. The separation of the fruit halves at the bottom permits clean and unrestricted ejection of the pit from the fruit without tearing or bruising of the fruit halves.

A further object of the invention is to provide the fruit holder with fruit supporting means which firmly maintains the fruit in position for the sequential operations thereon; such holding means functioning without puncturing or otherwise mutilating the fruit halves, as is desirable in processing fruit for certain select uses.

An additional object of the invention is to provide a fruit holder, as in the preceding paragraph, in which the fruit holding means includes flat, upstanding knives which initially perform a transverse bottom cut on the fruit between the halves, and thereafter remain in engagement with the inner sides thereof and serve as supporting elements for said halves; the latter being engaged on the outer sides by corresponding spring urged fingers.

A further object of the invention is to provide a holding unit for fruit which will be effective for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1:
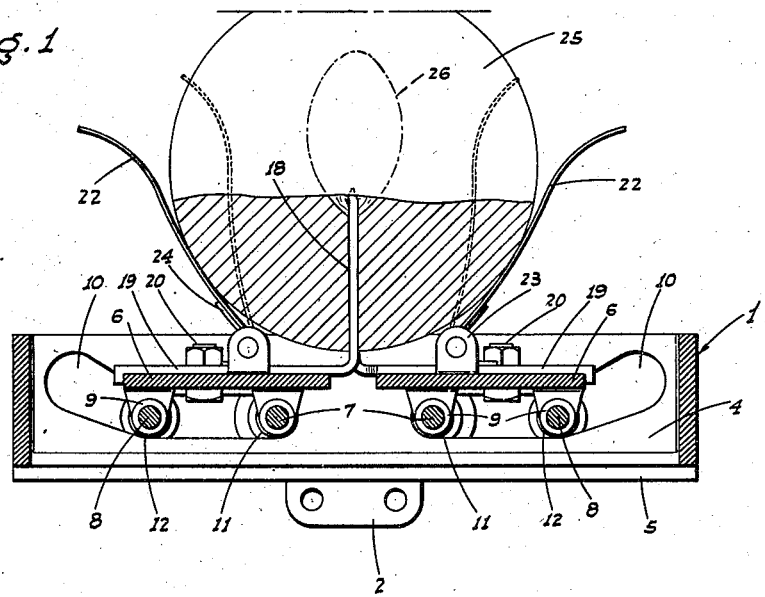
Figure 1 is a longitudinal sectional elevation of the fruit holder with the fruit supported thereby and the bottom cut made by the upstanding supporting knives.

Referring now more particularly to the characters of reference on the drawings, the fruit holder, of which a number are used in each automatic fruit halving and pitting machine in spaced relation on an endless conveyor, comprises the following:

The numeral 1 indicates a rectangular frame, said frame being open top and bottom on opposite sides and centrally of its ends the frame 1 includes depending attachment ears 2 which connect with corresponding ones of transversely spaced chains 3 which the endless conveyor of the machine includes. At their lower edges the sides 4 of the frame include laterally inwardly disposed, downwardly depending full-length stabilizing rails 5 which ride on top of the chain rollers to prevent teetering of the fruit holder.

A pair of transversely extending base plates 6 are disposed in the holder between the sides 4 thereof; said base plates being spaced apart slightly in the direction of travel, and parallel transversely of the holder. The base plates are normally horizontal and alined in the manner shown in Fig. 1.

The base plates 6 are each supported, from below, by a pair of transversely extending, longitudinally spaced parallel cross shafts 7 and 8; said cross shafts, adjacent the ends of the plates, extending through bearings 9 formed on and depending from said plates. The sides 4 of the frame 1 are formed, adjacent opposite ends of each plate, with elongated cam slots 10. Flanged rollers 11 and 12 are secured on the shafts 7 and 8, respectively, and ride in the cam slots 10.

The rollers 11 have axially outwardly projecting roller extensions 13 thereon for the purpose which hereinafter appears.

Each side 4 exteriorly thereof and between the corresponding cam slots 10 is fitted with a spool 14 on which an opposed leg, coil spring 15 is disposed, the legs 16 extending from the spool in opposite directions and engaging with enlarged pulley-like guides 17 on the rollers 11 between the latter and the roller extensions 13. The action of the spring legs 16 is to cause the rollers 11 to normally move toward and engage in adjacent ends of the cam slots 10, whereby the base plates 6 are then in the horizontal and adjacent position shown in Fig. 1.

Adjacent end portions of the cam slots 10 are straight and horizontal, and the rollers 11 engage therein with an easy running but relatively close fit. The opposite or outer end portions of the cam slots 10 incline upwardly and are progressively increased in height toward the outer end. It will thus be seen that when the rollers 12 ride into the outer end portions of the cam slots 10, considerable vertical play is possible, for the reason as will hereinafter appear:

A pair of flat upstanding knives 18 are normally disposed transversely in edge-to-edge but spaced relation centrally between adjacent edges of the base plates 6; the knives 18 including oppositely projecting, normally horizontal bottom flanges 19. The bottom flanges 19 intersect the corresponding base plates and are secured thereto by bolts 20. The upper edges of the knives 19 are sharpened, as at 21, and these sharpened edges converge inwardly and downwardly, the lower end of the sharpened edge of one knife being drawn toward and substantially into engagement with the lower end of the sharpened edge of the other knife, whereby to form a substantially continuous V-shaped cutting edge when the knives 18 are in their normal position, as shown in Fig. 1.

Each base plate 6 is fitted, centrally of its ends and intermediate its side edges, with a spring-urged, upstanding fruit engaging finger 22 of substantial width and curved outwardly at the top for ease of fruit engagement between said fingers. The fingers 22 are pivotally mounted between upstanding ears 23 for swinging movement in a direction lengthwise of the direction of travel; springs 24 urging said fingers toward each other.

In operation of the above described holder, each holder moves in the automatic machine intermittently, and step by step, through different stations. At one station a fruit 25, such as a peach or apricot, is impaled upon the knives 18 with the suture of the fruit extending transversely of the direction of travel; said knives thus performing a bottom cut on the fruit which extends upwardly to adjacent the pit 26 and of a width substantially equal to that of the pit. The V-shape defined by the cutting edges 21 of the knives 18 permit the bottom cut to be made to a point very close to the pit. As so impaled on the knives 18 the fruit is frictionally engaged on opposite sides by the spring urged fingers 22.

With the fruit so positioned in the holder the latter moves to the next station, where the fruit is acted upon by a downwardly moving side cutting unit, indicated generally at 27, and which unit includes a pair of transversely spaced, vertically disposed knives 28. The knives 28 are disposed parallel to each other but flatwise to the direction of travel of the conveyor; said knives being spaced apart a distance substantially equal to the width of the pit 26. The knives 28 are mounted by parallel links 29 on a cross head 30 for parallel separating movement, and are normally urged towards each other by a connecting tension spring 31. The cross head 30 is operatively suspended in the machine by a vertical member 32 adapted to be reciprocated in timed relation to movement of the holder to the fruit side cutting station. The knives 28 are sharpened along adjacent edges, and are relatively pointed at their lower ends and sharpened on both edges of said points.

After the holder comes to rest at the side cutting station, the side cutting unit 27 descends and knives 28 cut the fruit 25 on both sides of the pit; the cuts running inwardly directly to the pit, and extending from top to bottom of the fruit. In order to assure that the descending knives 28 clear the outer edges of the upstanding knives 18, upwardly and inwardly inclined cam edges 33 are formed on adjacent edges of the knives 28 intermediate their ends; said cam edges engaging fixed cam pins 34 on rigid cross member 35 when the side cutting unit has descended to an extent that the sharpened points of the knives 28 closely approach the knives 18. With continued descent of the side cutting unit the cam pins 34 riding against the cam edges 33 cause the knives 28 to separate slightly and to an extent such that said knives pass closely along the outer edges of the knives 18. It will be noted that with the bottom cut made by the knives 18 and the side cuts made by the knives 28, the peach halves 36 are cleanly cut apart about the sides and bottom. The only remaining uncut portion is the top portion above the pit.

Figure 3:
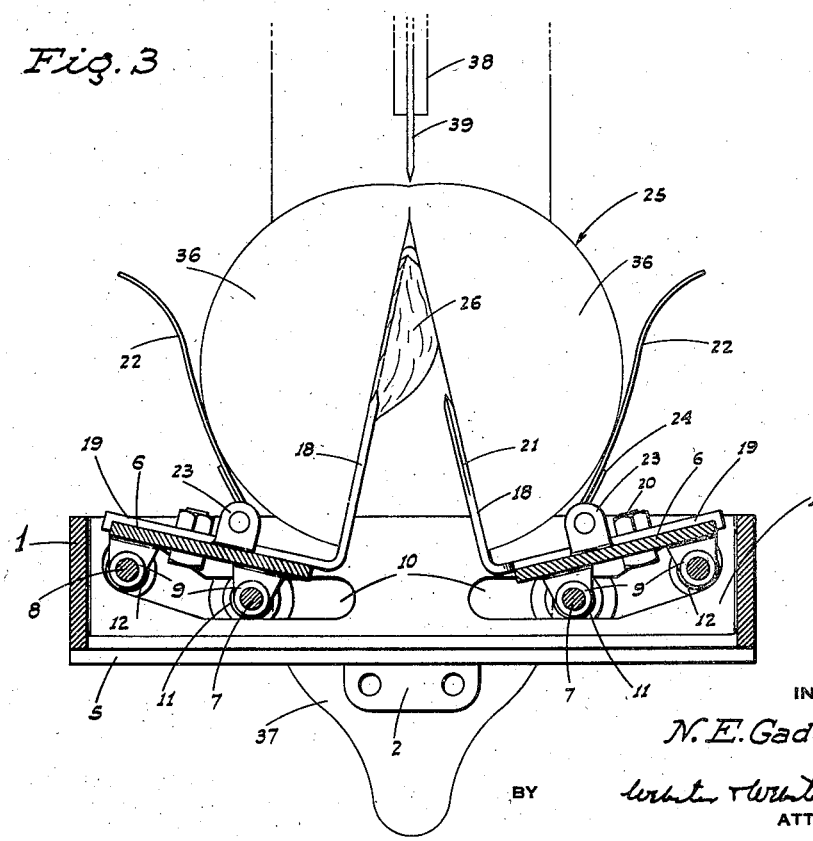
Figure 3 is a longitudinal sectional elevation of the holder after the fruit has been cut both bottom and sides; the fruit halves being spread apart about the uncut top portion as a hinge and preparatory to ejection of the pit.
Figure 2:
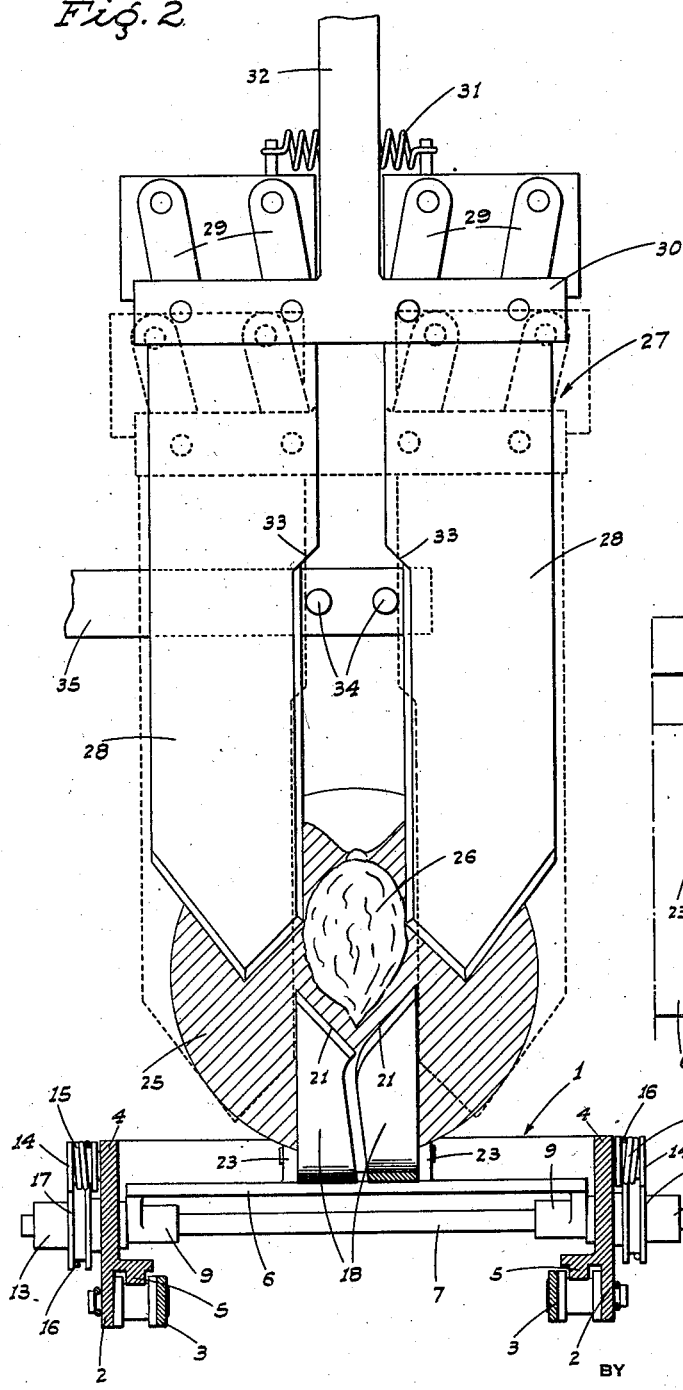
Figure 2 is a cross section of the holder with the fruit therein, illustrating the side cutting operation.
Figure 4:
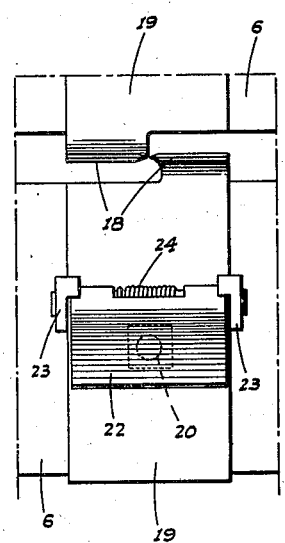
Figure 4 is a fragmentary plan view of the fruit holder.

After the side cutting unit 27 descends and subsequently elevates clear of the supported fruit on the holder, the latter moves to a pit ejecting station, as shown in Fig. 3, and at which station a pair of transversely spaced, depending tongue-like cams 37 descend between the roller extensions 13 on opposite sides of the frame 1. With such descent of the cams the roller extensions 13 will move apart equally in opposite directions and the rollers 11 and 12 move along the cam slots 10 to effect a corresponding movement of the base plates 6. Due to the shape of the cam slots 10 the rollers 12 elevate relative to the rollers 11, causing the base plates to be tilted upwardly at their outer edges at the same time that the separating movement thereof occurs. When the base plates are thus tilted towards each other the knives 18 corresponding to said base plates move apart but assume an upwardly and inwardly converging position, as clearly shown in Fig. 3. Such relative movement of the knives 18 separates the fruit halves 36, with the uncut top portion of the fruit then serving as a hinge to maintain the fruit centered in the holder. The fruit halves are thus separated at the bottom and about the top hinge without any tearing or rupturing of the flesh of the fruit halves; said halves being firmly and frictionally engaged between corresponding knives 18 and spring-urged fingers 22.

The holder compensates, in the above operation, for fruit of different sizes by reason of the fact that the rollers 12 may float vertically in the progressively increased-width outer end portions of the cam slots 10. By reason of this floating feature the angle of convergence of the separate knives 18 may vary, depending on the size of the fruit. Various size fruit is thus proportionately equally separated or opened at the bottom for a clean and unrestricted ejection of the pit, and which ejection is accomplished as follows:

With the base plates 6 held apart by the cams 37, with resultant separating of the fruit halves and tilting of said plates, a pit ejecting unit, indicated generally at 38, moves downwardly from above, engaging the pit 25 and ejecting it downwardly from the fruit between the then bottom separated halves 36. The pit ejecting unit includes a cutter blade 39 disposed to cut through the top portion of the fruit as the pit is ejected, with the cut in the same tranverse plane as the side cuts made by the knives 23. The halves 36 are thus separated from each other.

After the pit is ejected and the top of the fruit cut as above, the pit ejecting unit 38 lifts free of the holder and the latter moves forwardly to another station, where the separate halves are removed from said holder for subsequent processing.

From the foregoing description it will be readily seen that there has been produced such a holding unit for fruit as substantially fulfills the objects of the invention, as set forth herein.

While this specification sets forth in detail the present and preferred construction of the holding unit for fruit, still in practice such deviations from such detail may be resorted to as do not form a departure from the spirit of the invention, as set forth herein.

Having thus described the invention the following is claimed as new and useful and upon which Letters Patent is desired:

1. A fruit holder for automatic fruit machinery, said holder comprising a frame, a pair of adjacent supports mounted on the frame for separating movement, means to separate the supports, a pair of top sharpened knives upstanding intermediate the supports in normally adjacent edge to edge relation transversely of said direction of separating movement, means rigidly mounting the knives in connection with corresponding supports so that the knives separate relative to each other upon separation of the supports, and fruit holding means upstanding from the supports in spaced but cooperative relation to corresponding knives.

2. A fruit holder for automatic fruit machinery, said holder comprising a frame, a pair of adjacent supports mounted on the frame for separating movement, means to separate the supports, a pair of top sharpened knives upstanding intermediate the supports in normally adjacent edge to edge relation transversely of said direction of separating movement, means rigidly mounting the knives in connection with corresponding supports so that the knives separate relative to each other upon separation of the supports, and fruit holding means upstanding from the supports in spaced but cooperative relation to corresponding knives; there being means, operative upon separation of the supports arranged to cause the supports to tilt toward each other.

3. A fruit holder for automatic fruit machinery, said holder comprising a frame, a pair of adjacent supports mounted on the frame for separating movement, means to separate the supports, a pair of top sharpened knives upstanding intermediate the supports in normally adjacent edge to edge relation transversely of said direction of separating movement, means rigidly mounting the knives in connection with corresponding supports so that the knives separate relative to each other upon separation of the supports, and fruit holding means upstanding from the supports in spaced but cooperative relation to corresponding knives; said last named means comprising upstanding spring-urged fingers pivotally mounted for swinging movement in the direction of separating movement of said supports.

4. A fruit holder for automatic fruit machinery, said holder comprising a frame, a pair of adjacent supports mounted on the frame for separating movement, means to separate the supports, a pair of top sharpened knives upstanding intermediate the supports in normally adjacent edge to edge relation transversely of said direction of separating movement, means rigidly mounting the knives in connection with corresponding supports so that the knives separate relative to each other upon separation of the supports, and fruit holding means upstanding from the supports in spaced but cooperative relation to corresponding knives; the sharpened top edges of the knives converging downwardly and forming a substantially V-shaped cutting edge.

5. A fruit holder as in claim 4 in which the knives are spaced apart slightly, but said cutting edges being substantially in engagement at their lower ends whereby the V-shaped cutting edge is substantially continuous.

6. A fruit holder as in claim 3 in which said spring-urged fingers are of substantial width, and at the top portion flare outwardly in the direction of swinging movement.

7. A fruit holder for automatic fruit machinery, said holder comprising a frame adapted for travel in a predetermined direction, a pair of supports mounted on the frame transversely thereof and in adjacent side by side relation, said supports being mounted for separating movement in the direction of travel of the frame, means to separate the supports, a pair of top sharpened knives upstanding intermediate the supports in normally adjacent edge to edge relation transversely of said direction of separating movement, means rigidly mounting the knives in connection with corresponding supports so that the knives separate relative to each other upon separation of the supports, and fruit holding means upstanding from the supports in spaced but cooperative relation to corresponding knives.

8. A fruit holder for automatic fruit machinery, said holder comprising a frame adapted for travel in a predetermined direction, a pair of supports mounted on the frame transversely thereof and in adjacent side by side relation, said supports being mounted for separating movement in the direction of travel of the frame, means to separate the supports, a pair of top sharpened knives upstanding intermediate the supports in normally adjacent edge to edge relation transversely of said direction of separating movement, means rigidly mounting the knives in connection with corresponding supports so that the knives separate relative to each other upon separation of the supports, and spring-urged engaging fingers upstanding from the supports in spaced but cooperating relation to corresponding knives.

9. A fruit holder for automatic fruit machinery, said holder comprising a frame adapted for travel in a predetermined direction, a pair of supports mounted on the frame transversely thereof and in adjacent side by side relation, said supports being mounted for separating movement in the direction of travel of the frame, means to separate the supports, a pair of top sharpened knives upstanding intermediate the supports in normally adjacent edge to edge relation transversely of said direction of separating movement, means rigidly mounting the knives in connection with corresponding supports so that the knives separate relative to each other upon separation of the supports, and spring-urged engaging fingers upstanding from the supports in spaced but cooperating relation to corresponding knives; there being means, operative upon separating of said supports and knives, to cause the supports to tilt toward each other whereby the then separated knives converge upwardly relative to each other.

10. A fruit holder for automatic fruit machinery, said holder comprising a frame, a pair of adjacent supports mounted on the frame for separating movement, means to separate the supports, a pair of top sharpened knives upstanding intermediate the supports in normally adjacent edge to edge relation transversely of said direction of separating movement, means rigidly mounting the knives in connection with corresponding supports so that the knives separate relative to each other upon separation of the supports, said upstanding knives when in such normally adjacent edge to edge relation being exposed above the supports and thus adapted to have a stone fruit impaled thereon from above whereby the knives bottom-cut said fruit upwardly to adjacent the stone, and fruit engaging members upstanding from the supports adapted to engage the impaled fruit on opposite sides whereby each fruit half is engaged between one such member and the corresponding knife.

11. A fruit holder as in claim 10 adapted to cooperate with a vertically movable side cutting unit; said side cutting unit including transversely spaced bottom sharpened knives operative to cut through the supported fruit from top to bottom on opposite sides and in the plane of said bottom cut.

12. In the combination in an automatic fruit machine of a fruit holder, and a vertically movable side cutting unit mounted to cooperate with said holder; said holder including a pair of top sharpened knives upstanding from the holder in normally adjacent edge to edge relation, said upstanding knives when in edge to edge relation being adapted to have a stone fruit impaled thereon from above whereby to bottom cut the fruit upwardly to adjacent the stone, and means to supportingly engage the impaled fruit from opposite sides; the vertically movable side cutting unit including transversely spaced bottom sharpened knives operative, upon lowering of the unit, to cut through the supported fruit from top to bottom on opposite sides and in the plane of said bottom cut.

13. A combination as in claim 12 in which the knives of the side cutting unit are transversely separable, spring means urging said side cutting knives toward each other, and cam means, operative upon predetermined descent of said unit, arranged to cause separation of the side cutting knives sufficient to clear the upstanding bottom cutting knives.

14. A combination as in claim 12 in which the upstanding cutting knives of the holder include sharpened top edges which converge inwardly and downward; the side cutting knives of said unit each being pointed at the lower end, each point having downwardly converging sharpened edges.

NORMAN E. GADDINI.